United States Patent
Nakamura et al.

(10) Patent No.: US 6,446,025 B1
(45) Date of Patent: Sep. 3, 2002

(54) MULTIPLE PROPAGATION WAVE PARAMETER MEASURING METHOD AND APPARATUS AND MACHINE-READABLE RECORDING MEDIUM RECORDING MULTIPLE PROPAGATION WAVE PARAMETER MEASURING PROGRAM

(75) Inventors: Yuki Nakamura; Yoshihiko Kuwahara; Tadashi Matsumoto; Kazuhiko Fukawa, all of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/277,684

(22) Filed: Mar. 26, 1999

(30) Foreign Application Priority Data

Mar. 26, 1998 (JP) .......................................... 10-079711

(51) Int. Cl.[7] .............................................. G01B 11/02
(52) U.S. Cl. ........................ 702/159; 342/378; 455/561
(58) Field of Search ........................... 702/159, 72, 76, 702/77; 342/393, 80, 378, 174, 153, 147; 375/141; 455/561, 456; 708/801

(56) References Cited

U.S. PATENT DOCUMENTS

| | | | | |
|---|---|---|---|---|
| 3,727,221 A | * | 4/1973 | Julier et al. .................... | 342/80 |
| 3,983,559 A | * | 9/1976 | Honore et al. ............... | 342/394 |
| 4,028,703 A | * | 6/1977 | Honore et al. ............... | 342/393 |
| 4,750,147 A | * | 6/1988 | Roy, III et al. ............. | 708/801 |
| 5,343,404 A | * | 8/1994 | Girgis .......................... | 702/72 |
| 5,381,444 A | * | 1/1995 | Tajima ........................ | 375/141 |
| 5,694,474 A | * | 12/1997 | Ngo et al. .................... | 381/66 |
| 6,006,110 A | * | 12/1999 | Raleigh ....................... | 455/561 |

FOREIGN PATENT DOCUMENTS

JP 6043235 2/1994

* cited by examiner

Primary Examiner—Marc S. Hoff
Assistant Examiner—Mohamed Charioui
(74) Attorney, Agent, or Firm—Dickstein, Shapiro, Morin & Oshinsky, LLP.

(57) ABSTRACT

In a multiple propagation wave parameter measuring method, transmission waves are radiated into an outer space. The transmission waves are received as a multiple propagation wave. Arrival directions of the transmission waves are measured on the basis of reception signals. The transmission wave arriving from one direction of the measured arrival directions is defined as a desired wave, and the transmission waves arriving from remaining directions are defined as unnecessary waves. A weight with which a reception power ratio of the desired wave to the unnecessary waves becomes maximum is calculated. The reception signals are multiplied with the weight to extract the reception signal in which the unnecessary waves are suppressed. A change in delay time of the desired wave from a transmitting device to a receiving device is calculated on the basis of the reception signal in which the unnecessary waves are suppressed. A machine-readable recording medium storing a multiple propagation wave parameter measuring program is also disclosed.

27 Claims, 9 Drawing Sheets

MULTIPLE PROPAGATION WAVE PARAMETER MEASURING METHOD AND APPARATUS AND MACHINE-READABLE RECORDING MEDIUM RECORDING MULTIPLE PROPAGATION WAVE PARAMETER MEASURING PROGRAM

BACKGROUND OF THE INVENTION

The present invention relates to a multiple propagation wave parameter measuring method and apparatus for measuring various parameters of a multiple propagation wave, and a machine-readable recording medium recording a multiple propagation wave parameter measuring program and, more particularly, to a multiple propagation wave parameter measuring method and apparatus for measuring as parameters an arrival direction of a transmission wave radiated from a transmitting means and a change in delay time of the transmission wave from the transmitting means to a receiving means, and a machine-readable recording medium recording a multiple propagation wave parameter measuring program.

Figure 10:
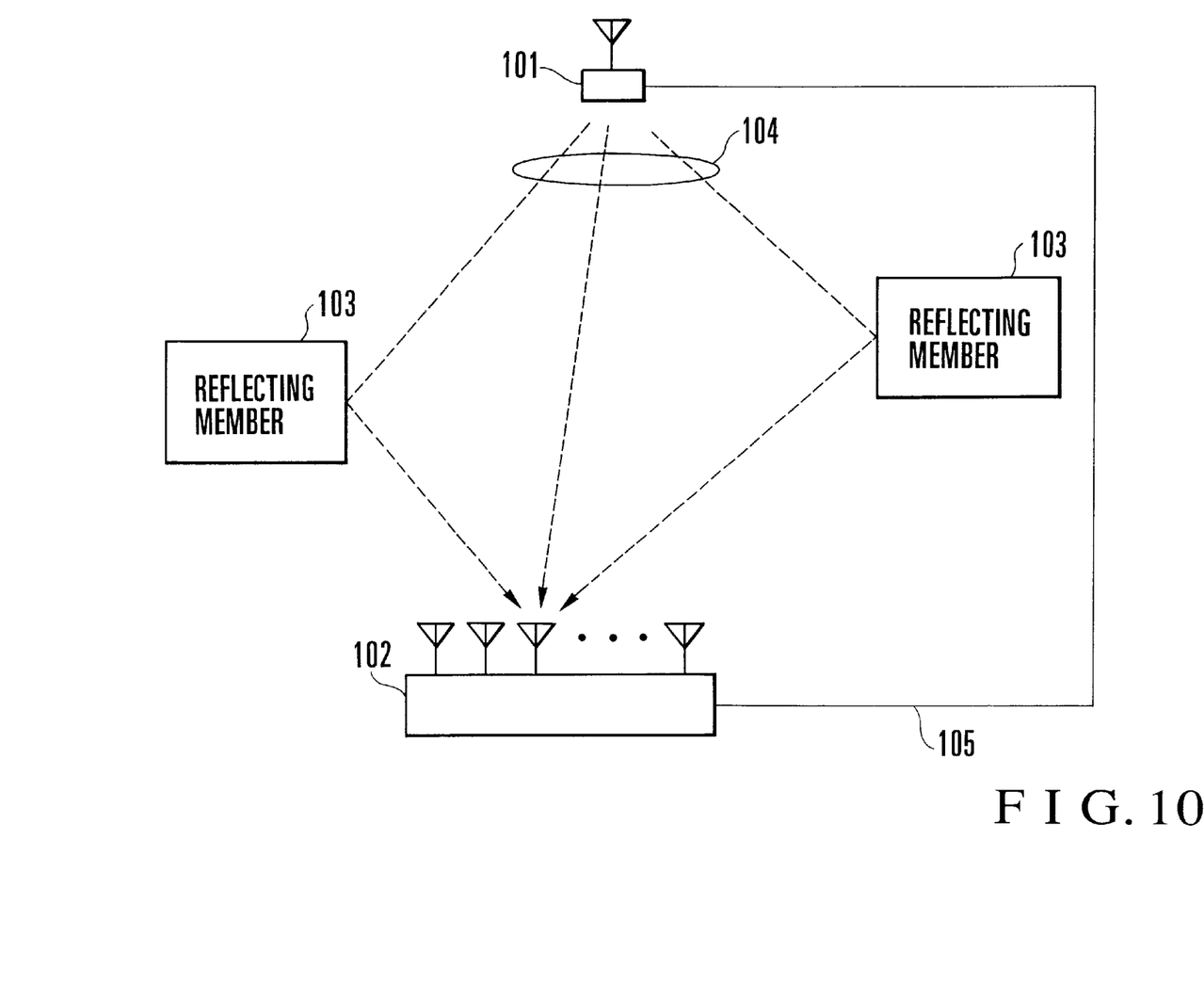
FIG. 10 is a view showing a conventional multiple propagation wave parameter measuring apparatus.

FIG. 10 shows the arrangement of a conventional multiple propagation wave parameter measuring apparatus. The multiple propagation wave parameter measuring apparatus shown in FIG. 10 comprises a transmitting device 101 for radiating transmission waves 104 in air and a receiving device 102 for receiving the transmission waves 104 and measuring various parameters.

When the transmission waves 104 are radiated from the transmitting device 101, the receiving device 102 directly receives some of the transmission waves 104. Reflecting members 103 (e.g., buildings) having the function of reflecting an electric wave reflect some of the transmission waves 104, and the receiving device 102 receives the reflected transmission waves. As described above, the transmission waves 104 arrive at the receiving device 102 via various routes. Therefore, the receiving device 102 receives them as a multiple propagation wave.

The receiving device 102 measures the arrival directions of the transmission waves 104 and their delay times from the transmitting device 101 to the receiving device 102 as follows.

An evaluation function is generated to estimate the arrival directions and delay times. This evaluation function is a function of an angle (arrival direction) and time (delay time).

The angular range of 0 to Θ and the time range of 0 to t in the evaluation function are calculated at intervals of ΔΘ and Δt, respectively. The peaks of the calculation values are found to estimate the arrival directions and delay times.

The delay times of two signals received at different timings are estimated by the above method, and the difference between the delay times is calculated to obtain a change in delay time.

To measure the change in delay time with high precision, a sync signal free from an influence of noise or the like must be used. For this purpose, in the multiple propagation wave parameter measuring apparatus shown in FIG. 10, to supply a sync signal from the transmitting device 101 to the receiving device 102 via a cable 105, the cable 105 connects the transmitting and receiving devices 101 and 102.

In the conventional multiple propagation wave parameter measuring apparatus shown in FIG. 10, a two-dimensional search is performed to estimate the two parameters, i.e., "arrival direction" and "change in delay time". This method, however, is time-consuming in signal processing, and a measurement result cannot be immediately obtained.

In the conventional multiple propagation wave parameter measuring apparatus, the cable 105 connects the transmitting and receiving devices 101 and 102. For this reason, the conventional multiple propagation wave parameter measuring apparatus is not suitable for measuring a change in delay time by moving the transmitting device 101 outdoors.

SUMMARY OF THE INVENTION

The present invention has been made in consideration of the conventional problems described above, and has as its object to shorten the measurement time for two parameters, i.e., "arrival direction" and "change in delay time".

It is another object of the present invention to allow measuring a change in delay time by moving at least one of transmitting and receiving sides.

In order to achieve the above objects of the present invention, there is provided a multiple propagation wave parameter measuring method comprising the steps of radiating transmission waves from transmitting means into an outer space, receiving the transmission waves by receiving means as a multiple propagation wave, measuring arrival directions of the transmission waves on the basis of reception signals output from the receiving means, defining the transmission wave arriving from one direction of the measured arrival directions as a desired wave and the transmission waves arriving from remaining directions as unnecessary waves, calculating a weight with which a reception power ratio of the desired wave to the unnecessary waves becomes maximum, and multiplying the reception signals with the weight to extract the reception signal in which the unnecessary waves are suppressed, and measuring a change in delay time of the desired wave from the transmitting means to the receiving means on the basis of the reception signal in which the unnecessary waves are suppressed.

DESCRIPTION OF THE PREFERRED EMBODIMENTS

The preferred embodiments of the present invention will be described with reference to the accompanying drawings.

First Embodiment

Figure 1:
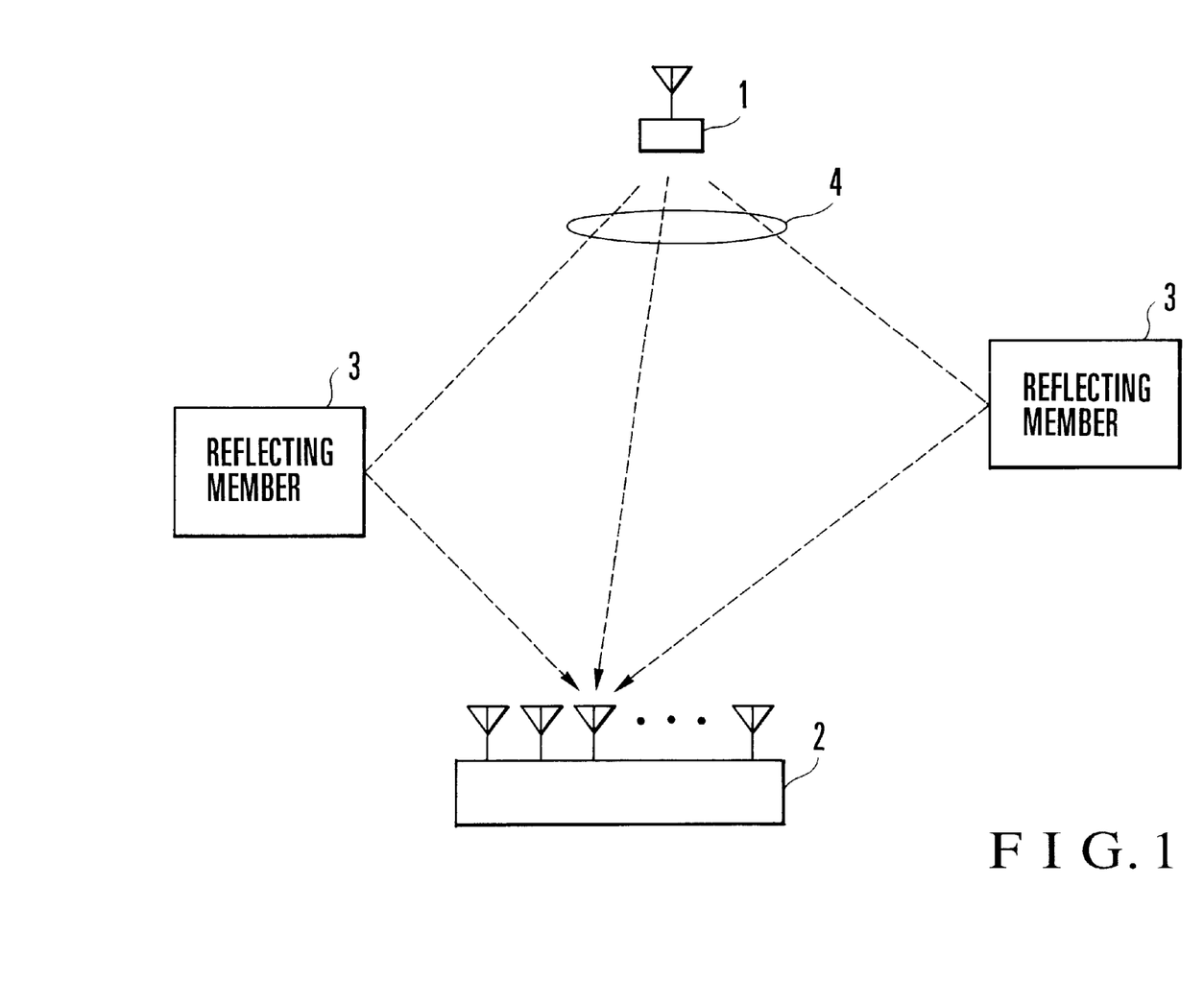
FIG. 1 is a view showing the arrangement of a multiple propagation wave parameter measuring apparatus according to the first embodiment of the present invention.

FIG. 1 shows a multiple propagation wave parameter measuring apparatus according to the first embodiment of the present invention. The multiple propagation wave parameter measuring apparatus shown in FIG. 1 comprises a transmitting device 1 serving as a transmitting means and a receiving device 2.

The transmitting device 1 radiates transmission waves 4 in air (outer space). The transmission waves 4 radiated from the transmitting device 4 form a periodic spread spectrum signal.

The receiving device 2 receives the transmission waves 4 as a multiple propagation wave and measures the arrival directions of the transmission waves 4 and their changes in delay times from the transmitting device 1 to the receiving device 2.

The receiving device 2 is fixed at a stationary position, and the transmitting device 1 is mounted on a movable carrier (not shown) and movable.

Figure 2:
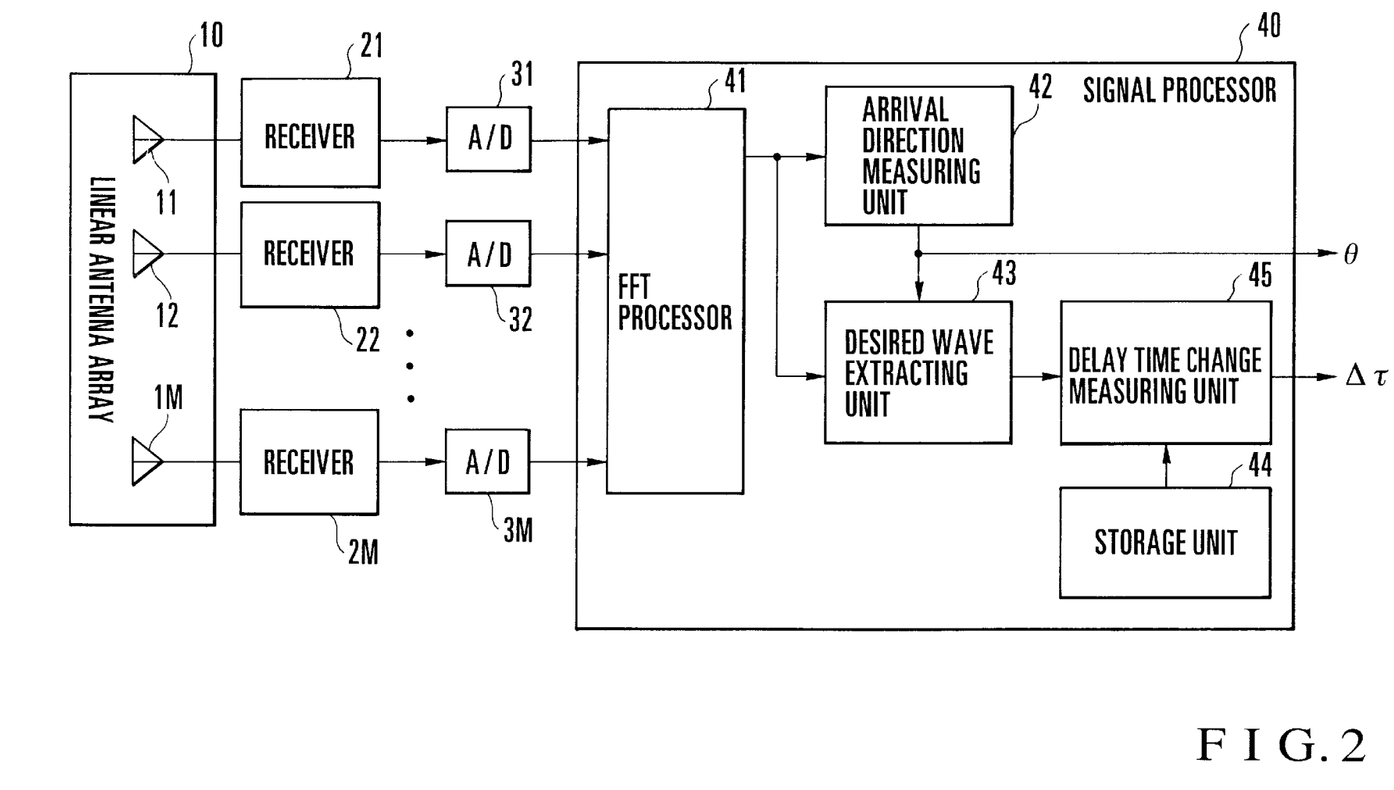
FIG. 2 is a block diagram showing the arrangement of a receiving device shown in FIG. 1.

FIG. 2 shows the arrangement of the receiving device 2 shown in FIG. 1.

The receiving device 2 shown in FIG. 2 comprises M antenna elements 11 to 1M (M is an integer of two or more), M receivers 21 to 2M respectively connected to the outputs of the antenna elements 11 to 1M, M A/D (analog/digital) converters 31 to 3M respectively connected to the outputs of the receivers 21 to 2M, and a signal processor 40 connected to the outputs of the A/D converters 31 to 3M.

The signal processor 40 comprises an FFT (Fast Fourier Transform) processor 41 connected to the outputs of the A/D converters 31 to 3M, an arrival direction measuring unit 42 connected to the output of the FFT processor 41, a desired wave extracting unit 43 connected to the outputs of the FFT processor 41 and arrival direction measuring unit 42, a storage unit 44, and a delay time change measuring unit 45 connected to the outputs of the desired wave extracting unit 43 and storage unit 44.

The antenna elements 11 to 1M are aligned in one direction to constitute a linear antenna array 10 serving as a receiving means. Antenna elements 11 to 1M receive the transmission waves 4 and supply the reception signals to the receivers 21 to 2M.

The receivers 21 to 2M have the function of converting the reception signals output from the antenna elements 11 to 1M into band-limited IFs (intermediate frequencies) which can be digitally processed.

The A/D converters 31 to 3M sample the reception signals output from the receivers 21 to 2M and convert the sampled reception signals into digital signals. The A/D converters 31 to 3M are set to sample the input signals for the same period of time at intervals of integer multiples of the periods of the transmission waves 4.

The FFT processor 41 in the signal processor 40 has the function of performing the FFT process of the reception signals output from the A/D converters 31 to 3M and analyze the frequencies of the FFT signals.

The arrival direction measuring unit 42 has the function of processing the reception signals output from the FFT processor 41 in accordance with moving space averaging and a MUSIC (Multiple Signal Classification) method and measuring arrival directions θ of the transmission waves 4.

The desired wave extracting unit 43 has the function of extracting only a reception signal having a desired wave from the reception signals output from the FFT processor 41. The desired wave is the transmission wave 4 arriving from one of the arrival directions measured by the arrival direction measuring unit. The transmission wave 4 arriving from another direction is called an unnecessary wave.

For example, if the transmission wave 4 arriving from the direction $\theta_1$ is defined as a desired wave, the transmission wave 4 arriving from a direction $\theta_2$ belongs to unnecessary waves. If the transmission wave 4 arriving from the direction $\theta_2$ is defined as a desired wave, the transmission wave 4 arriving from the direction $\theta_1$ belongs to unnecessary waves.

The storage unit 44 serves as a storage means pre-storing frequency spectrum data of the transmission waves 4 at a predetermined time.

The delay time change measuring unit 45 has the function of measuring a change $\Delta\tau$ in delay time of the desired wave by the moving space averaging and MUSIC method using the reception signal output from the desired wave extracting unit 43.

An arrival direction measuring algorithm for allowing the arrival direction measuring unit 42 to measure the arrival direction of the transmission wave 4 will be described below.

Reception signals $x_1, x_2, \ldots, x_M$ (complex numbers) received by the linear antenna array 10 made of the M antenna elements 11 to 1M are linear coupling results of D arrival signals $F_1, F_2, \ldots, F_D$ (complex numbers) and internal noise components (to be referred to as noise components hereinafter) $n_1, n_2, \ldots, n_M$ (complex numbers) of the M receivers 21 to 2M. The reception signals can be expressed by a matrix as follows:

$$X = AF + N \quad (1)$$

for $$X = [x_1, x_2, \ldots, x_M]^T \quad (2)$$

$$A = [a(\theta_1), a(\theta_2), \ldots, a(\theta_D)] \quad (3)$$

$$F = [F_1, F_2, \ldots, F_D]^T \quad (4)$$

$$N = [n_1, n_2, \ldots, n_M]^T \quad (5)$$

A matrix A represented by equation (3) is called an array manifold, and its column vector a (θ) is a response of the linear antenna array 10 to the direction θ and called a steering vector. This steering vector a (θ) is expressed as follows using responses $a_1(\theta), a_2(\theta), \ldots, a_M(\theta)$ (complex numbers) to the directions θ of the M antenna elements 11 to 11M:

$$a(\theta) = [a_1(\theta) \; a_2(\theta), \ldots, a_M(\theta)]^T \quad (6)$$

where T is the transposed matrix.

If the covariance matrix of equation (1) is defined as S, the following equation is obtained:

$$S_{MM} = \overline{XX^H} \quad (7)$$

where H is the complex conjugate transposed matrix, and an overline indicates the average.

Assume that the arrival signals $F_1$ to $F_D$ are not correlated with the noise components $n_1$ to $n_M$, that the noise components $n_1$ to $n_M$ are not correlated with each other, and that the M noise powers are equal to each other, i.e., $\sigma^2$ for descriptive convenience. The following equation is defined:

$$S_{MM} = A\overline{FF^H}A^H + \sigma^2 I = APA^H + \sigma^2 I \quad (8)$$

The following matrix is called a signal correlation matrix:

$$P = \overline{FF^H} \quad (9)$$

where I is the unit matrix.

Since the D arrival signals $F_1$ to $F_D$ are correlated with each other, the moving space averaging is performed for the covariance matrix $S_{MM}$.

Figure 3:
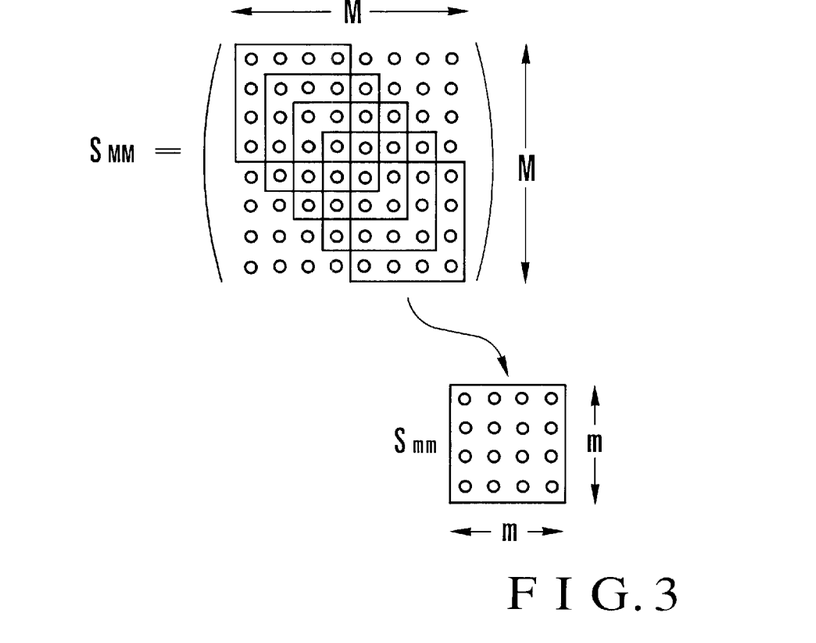
FIG. 3 is a view for explaining moving space averaging.

FIG. 3 explains moving space averaging. According to the moving space averaging, the covariance matrix $S_{MM}$ obtained from the linear antenna array 10 made of M antenna elements is divided into sub-array matrices $S_{mm}$ in units of m elements, as shown in FIG. 3, and the sub-array matrices $S_{mm}$ are added to obtain a sum. The moving space averaging is performed for the covariance matrix $S_{MM}$ to suppress correlation among the arrival signals $F_1$ to $F_D$.

The covariance matrix $S_{MM}$ undergone moving space averaging is defined as S to obtain the following equation:

$$S=APA^H+\sigma^2 I \tag{10}$$

At this time, the steering vector $a(\theta)$ is given as follows:

$$a(\theta)=[a_1(\theta), a_2(\theta), \ldots a_m(\theta)]^T \tag{11}$$

for m>D

The direction of an arrival signal will be estimated using the MUSIC method.

The covariance matrix S is decomposed into m eigenvalues $\lambda_1, \lambda_2, \ldots, \lambda_D, \lambda_{D+1}, \ldots, \lambda_m$. In this case, the following condition holds:

$$\lambda_1 \geq \lambda_2 \geq \ldots \geq \lambda_D \tag{12}$$

$\lambda_1$ to $\lambda_D$ are eigenvalues of the arrival signals, and $\lambda_{D+1}$ to $\lambda_m$ $(=\sigma^2)$ are the eigenvalues of the noise components.

When the eigenvector for the eigenvalue of the noise component of the covariance matrix S is given as $E_N$, the following equation holds:

$$SE_N=\sigma^2 E_N \tag{13}$$

A substitution of equation (10) into equation (13) yields:

$$(APA^H+\sigma^2 I)E_N \tag{14}$$

When the arrival signals $F_1$ to $F_D$ are not perfectly correlated with each other, and all the arrival directions are different, the following equation holds:

$$A^H E_N=0 \tag{15}$$

The peak is searched using the following equation as an evaluation function to estimate the direction of the arrival signal:

$$P_{MU}(\theta)=1/(a^H(\theta)E_N E_N^H a(\theta)) \tag{16}$$

A desired wave extraction algorithm for causing the desired wave extracting unit 43 to extract only a reception signal having a desired wave from the reception signals will be described below.

Assume that the transmission waves 4 arrive from the directions $\theta_1, \theta_2, \ldots, \theta_D$, and that only the transmission signal 4 arriving from the direction $\theta_1$ is extracted. In this case, the transmission wave 4 arriving from the direction $\theta_1$ is the desired wave, while the transmission waves 4 arriving from the remaining directions $\theta_2$ to $\theta_D$, are unnecessary waves.

To extract only the reception signal having the desired wave from all the reception signals, a weight with which the reception power ratio of the desired wave to the unnecessary waves becomes maximum is obtained. The weight is multiplied with the reception signal to extract a reception signal in which the unnecessary waves are suppressed. That is, the weight is so obtained as to form null components in the directions $\theta_2$ to $\theta_D$ to eliminate the unnecessary waves and pass only the desired wave arriving from the direction $\theta_1$.

This will be described in more detail.

A reception signal X(t) contains a desired wave component $X_d(t)$, an unnecessary component $X_i(t)$, and a noise component $X_n(t)$ of the receivers 21 to 2M. That is, X(t) is expressed as follows:

$$X(t)=X_d(t)+X_i(t)+X_n(t) \tag{17}$$

Assuming the covariance matrix of $X_i(t)+X_n(t)$ as R, the following equation holds:

$$R=E\{[X_i(t)+X_n(t)]^*(X_i(t)+X_n(t))^T\} \tag{18}$$

where $E\{*\}$ is the ensemble average, and * is the complex conjugate.

If the steering vector of the unnecessary wave is defined as $A_i$, equation (18) is equivalent to the following equation:

$$R=\overline{A_i A_i^H}+\sigma^2 I \tag{19}$$

In addition, if the steering vector of the desired wave is defined as $A_d$, the weight vector W is defined as follows using the inverse matrix of the matrix R and the vector $A_d$:

$$W=\alpha R^{-1} A_d^* \tag{20}$$

where $\alpha$ is an arbitrary constant excluding zero.

When the reception signal X(t) containing all the components shown in equation (17) is multiplied with this weight vector W to obtain W*X(t), the unnecessary component $X_i(t)$ and noise component $X_n(t)$ are eliminated from the reception signal X(t) by the matrix $R^{-1}$. Only the desired wave component $X_d(t)$ can be extracted. That is, only the reception signal of the transmission wave 4 arriving from the direction $\theta_1$ can be extracted.

Similarly, to extract the reception signals of the transmission waves 4 arriving from the directions $\theta_2$ to $\theta_D$ the weight vectors W are obtained on the basis of the steering vectors $A_i$ of the unnecessary waves to obtain desired wave components W*X(t), respectively.

A delay time change measuring algorithm for causing the delay time change measuring unit 45 to measure a change in delay time of the transmission wave 4 will be described below.

The desired wave extracting unit 43 extracts 2K+1 IF $(f_0 \pm \Delta f \times K)$ components from the spectra of the reception signals frequency-converted. by the FFT processor 41. The desired wave extracting unit 43 multiplies the respective frequency spectrum components with a weight to extract each frequency spectrum component of the desired wave.

A matrix $Y_1$ represented by equation (21) is generated on the basis of this frequency spectrum components $y_{-K}, y_{-K+1}, \ldots y_0, y_1, \ldots, y_K$ (complex numbers) of the desired wave:

$$Y_1=[y_{-K}, y_{-K+1}, \ldots, y_0, y_1, \ldots, y_K] \tag{21}$$

A signal having a frequency spectrum of the transmission wave 4 at predetermined time is defined as a reference signal. A matrix V represented by equation (22) is generated on the basis of IF $(f_0 \pm \Delta f \times K)$ components $v_{-K}, v_{-k+1}, \ldots, v_0, v_1, \ldots, v_K$ (complex numbers) of the reference signal:

$$V=[v_{-K}, v_{-K+1}, \ldots, v_0, v_1, \ldots, v_K] \tag{22}$$

As described above, since the A/D converters 31 to 3M sample the reception signals at intervals of integer multiples of the periods of the transmission waves 4, the delay amounts of the reception signals with reference to the predetermined time can be known by comparing the sampled reception signals with the reference signal.

Figure 4A:
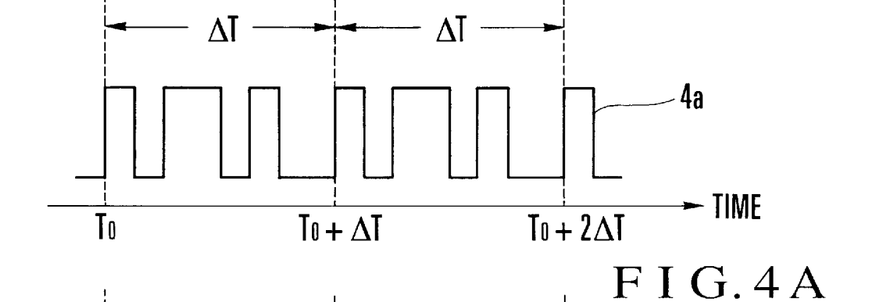
FIGS. 4A and 4B are views for explaining reception signals sampled by A/D converters.
Figure 4B:
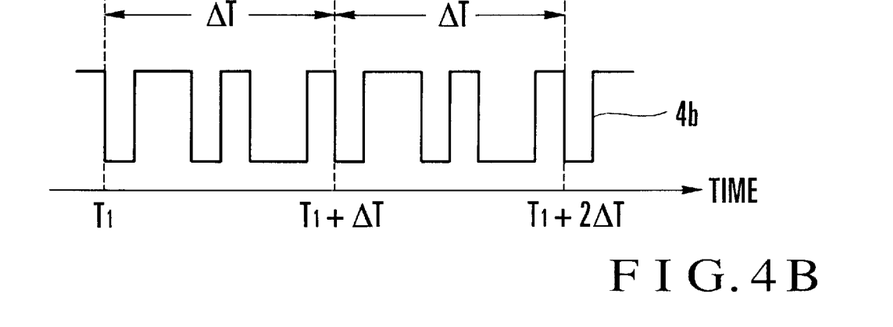

FIGS. 4A and 4B explain reception signals sampled by the A/D converters 31 to 3M. FIG. 4A shows a transmission wave 4a when radiated from the transmitting device 1, and FIG. 4B shows a transmission wave 4b when received by the linear antenna array 10. The abscissa in FIG. 4A or 4B represents time.

Assume that the period of the transmission wave 4a is defined as $\Delta T$, and that the frequency spectrum of the reference signal is that of the transmission wave 4a at time $T_0$. In this case, the frequency spectrum of the reference signal is equivalent to that of the transmission wave 4a at time $T_0 + n\Delta T$ (n is a natural number).

When the reception signal sampled at time T1 is compared with the reference signal to obtain the delay time of the reception signal of the transmission wave 4a at time $T_0$, the reception signal sampled at time $T_1 + n\Delta T$ is compared with the reference signal to obtain the delay time of the reception signal of the transmission wave 4a at time $T_0 + n\Delta T$, thereby obtaining the change in delay time during $n\Delta T$.

Each frequency component of the reception signal represented by equation (21) is divided by each frequency component of the reference signal represented by equation (22) to normalize the matrix $Y_1$. The normalized matrix is given as Y:

$$Y = [y_{-k}/v_{-k}, y_{-k-1}/v_{-k-1}, \ldots, y_0/v_0, \ldots, y_1/v_1, \ldots, y_K/v_K] \quad (23)$$

The respective frequency components of the normalized reception signal are linear coupling results of the D arrival signals $F'_1, F'_2, \ldots, F'_D$ (complex numbers) and the noise frequency components $n'_{-K}, n'_{-K-1}, \ldots, n'_K$ (complex numbers) as in equation (1). That is, $$Y = A'F' + N' \quad (24)$$

In this case, the array manifold A' is expressed by:

$$A' = [a'(\tau_1), a'(\tau_2), \ldots, a'(\tau_D)] \quad (25)$$

and the steering vector $a'(\tau)$ is expressed by:

$$a'(\tau) = [e^{-j2\pi(f0 - \Delta f \times K)\tau}, \ldots, e^{-j2\pi f0 \tau}, \ldots, e^{-j2\pi(f0 + \Delta f \times K)\tau}]^T \quad (26)$$

This equation represents the reception power of each frequency component by the linear antenna array 10 with the delay time $\tau$.

The delay time from the predetermined time $T_0$ is estimated using a technique similar to the arrival direction measuring algorithm.

More specifically, the covariance matrix $T_{2K+1}$, of equation (24) is obtained as follows:

$$T_{2K+1} = \overline{YY^H} \quad (27)$$

Moving space averaging is performed for equation (27). If the covariance matrix $T_{2K+1}$ undergone moving space averaging is given as T, the following equation holds:

$$T = A'P'A'^H + \sigma^2 I \quad (28)$$

In this case, the following equation holds:

$$P' = \overline{F'F'^H} \quad (29)$$

When the eigenvector for the eigenvalue of the noise component of the covariance matrix T is given as $E'_N$, the evaluation function for estimating the delay time can be expressed as follows:

$$P_{MU}(\tau) = 1/(a^H(\tau) E'_N E'^H_N a(\tau)) \quad (30)$$

so that a peak is searched using this evaluation function to estimate a delay time with respect to the predetermined time $T_0$.

If the delay times from the predetermined time $T_0$ which are estimated on the basis of the reception signals sampled by the A/D converters 31 to 3M at different timings, e.g., (i−1)th and ith times (i≧2) are defined as $\tau_{i-1}$ and $\tau_i$, respectively, a change $\Delta\tau$ in delay time during the sampling interval $n\Delta T$ is obtained as follows:

$$\Delta\tau = \tau_i - \tau_{i-1} \quad (31)$$

Figure 5:
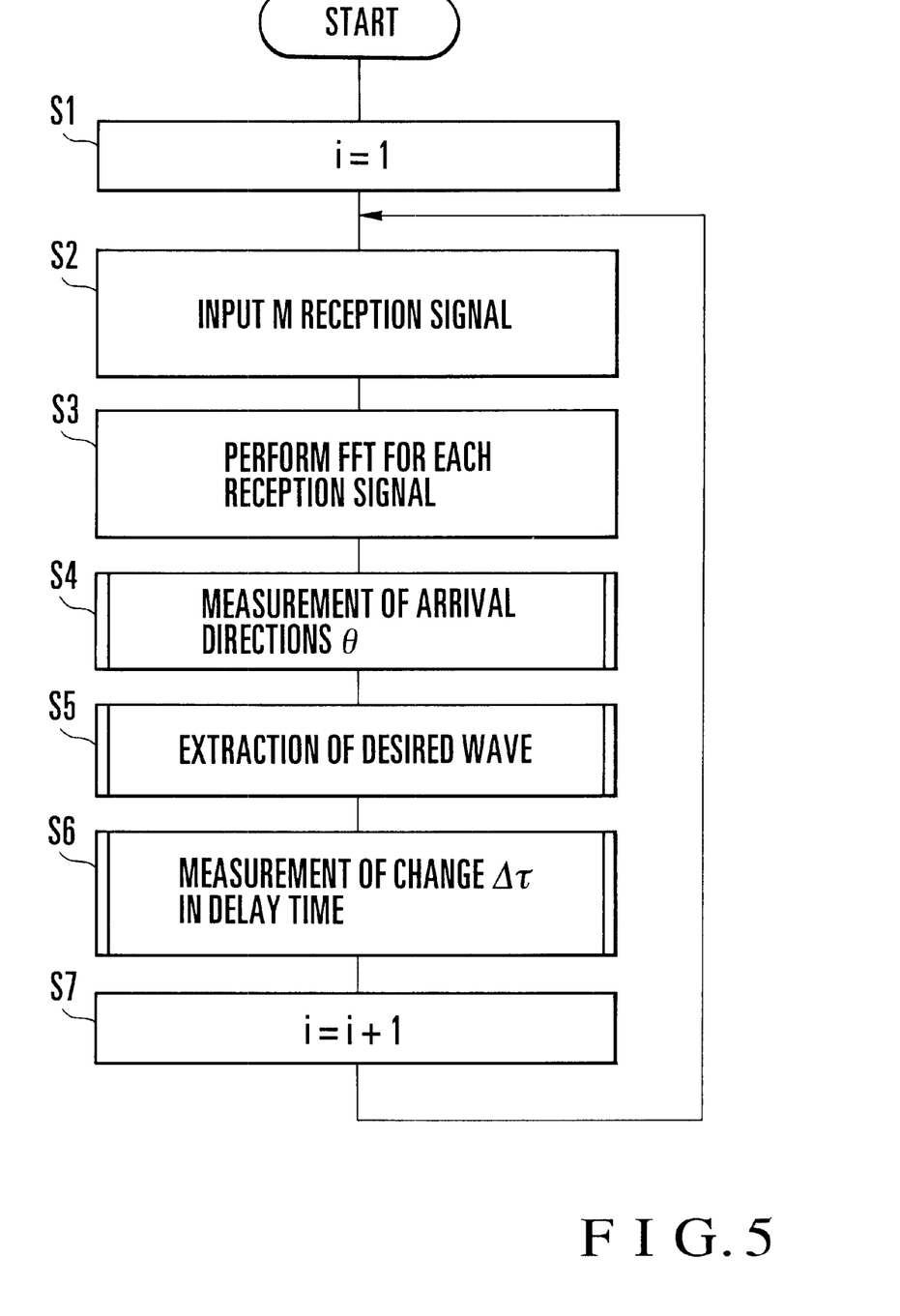
FIG. 5 is a flow chart showing the operation flow of a signal processor shown in FIG. 2.

The operation of the multiple propagation wave parameter measuring apparatus shown in FIG. 1 will be described with reference to FIG. 5. FIG. 5 shows the operation flow of the signal processor 40 shown in FIG. 2.

As shown in FIG. 1, when the transmission waves 4 are radiated from the transmitting device 1, the receiving side directly receives some of the transmission waves 4. The reflecting members 3 reflect some of the transmission waves 4, and the receiving side receives the reflected transmission waves 4 as well.

The M antenna elements 11 to 1M constituting the linear antenna array 10 receive the transmission waves 4 passing through various routes, as shown in FIG. 2.

The reception signals output from the antenna elements 11 to 1M are converted by the receivers 21 to 2M into IFs which can be digitally processed, respectively.

The reception signals converted into the IFs are simultaneously sampled by the A/D converters 31 to 3M at the intervals of the integer multiples of the periods of the transmission waves 4. The sampled signals are converted into digital signals, which are then input to the signal processor 40.

The M reception signals output from the A/D converters 31 to 3M to the signal processor 40 are input to the FFT processor 41. An input reception signal may also be referred to as an "ith input reception signal" (steps S1 and S2).

The M reception signals input to the FFT processor 41 are FFT-processed and frequency-analyzed (step S3).

The reception signals frequency-analyzed by the FFT processor 41 are output to the arrival direction measuring unit 42 and subjected to the moving space averaging and MUSIC method, thereby measuring the arrival directions θ of the transmission waves 4 (step S4).

The reception signals frequency-analyzed by the FFT processor 41 are also output to the desired wave extracting unit 43. The desired wave extracting unit 43 extracts the reception signal of the transmission wave 4 arriving from each direction θ and outputs each extracted reception signal to the delay time change measuring unit 45 (step S5).

The reception signals output from the desired wave extracting unit 43 are subjected to the moving space averaging and MUSIC method in the delay time change measuring unit 45 to measure changes $\Delta\tau$ in delay times of the transmission waves 4 arriving from the respective directions θ (step S6).

The flow then returns to step S2 to read reception signals output from the A/D converters 31 to 3M again. The input reception signals. are (i+1)th input reception signals (step S7).

As described above, steps S2 to S7 are repeated.

Figure 6:
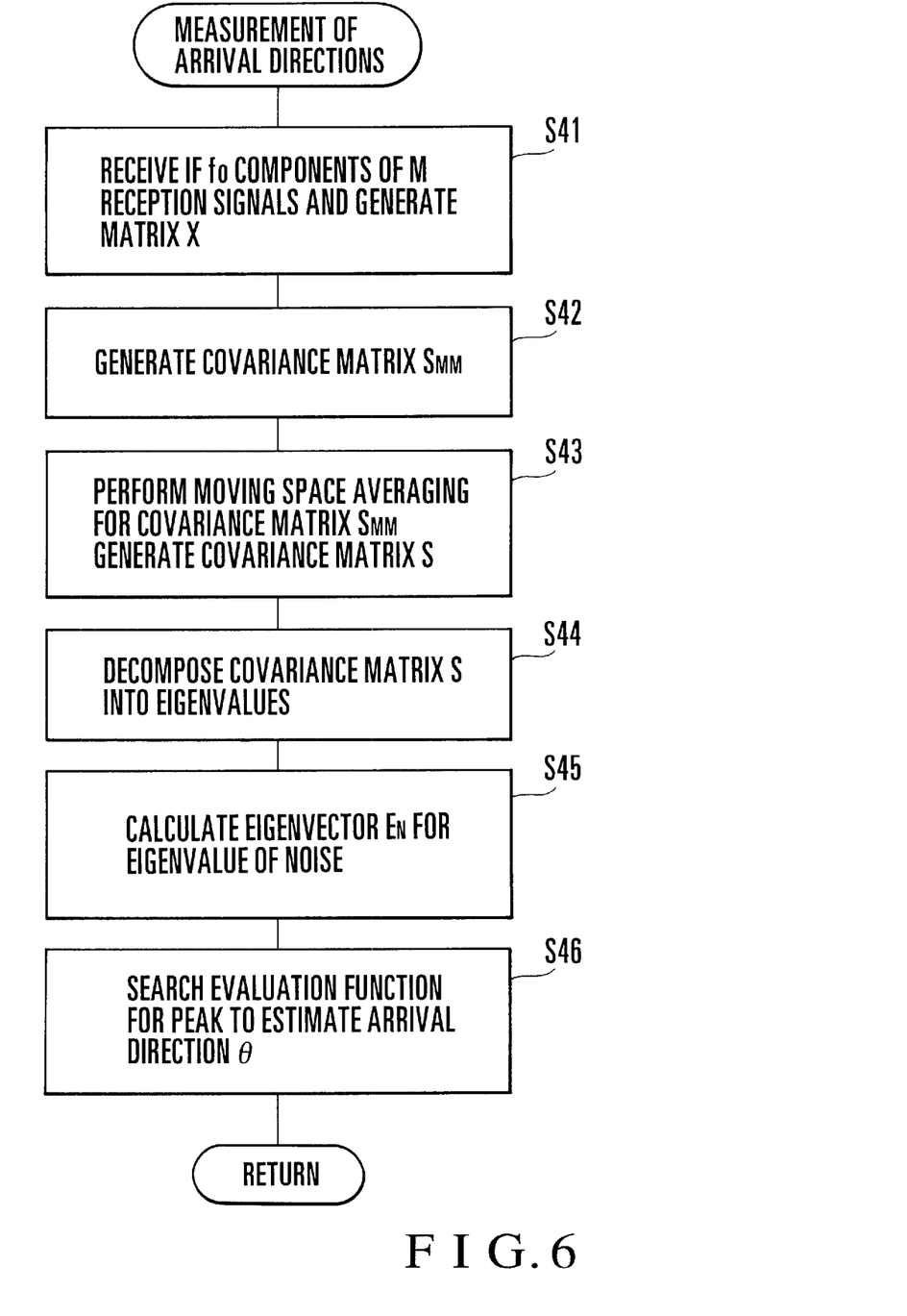
FIG. 6 is a flow chart showing the operation flow of an arrival direction measuring unit shown in FIG. 2.

FIG. 6 shows the operation flow of the arrival direction measuring unit 42 shown in FIG. 2. The operation of the arrival direction measuring unit 42 will be described in detail with reference to FIG. 6.

The arrival direction measuring unit 42 extracts IF $f_0$ components of the M reception signals frequency-analyzed by the FFT processor 41 to generate the matrix X represented by equation (2) (step S41). The arrival direction measuring unit 42 generates the covariance matrix $S_{MM}$ of the matrix X, as indicated by equation (7) (step S42).

The arrival direction measuring unit 42 performs moving space averaging for the covariance matrix S., to suppress the correlation of the arrival signals. At this time, the number m of rows and columns of the sub-array matrix $S_{mm}$ obtained by dividing the covariance matrix $S_{MM}$ is preset to be larger than the number D of the arriving transmission waves 4.

The resultant covariance matrix is defined as S (step S43).

The arrival direction measuring unit 42 decomposes the covariance matrix S into eigenvalues to obtain m eigenvalues represented by equation (12) (step S44). The arrival direction measuring unit 42 then calculates an eigenvector $E_N$ for the minimum one of the m eigenvalues (step S45).

The arrival direction measuring unit 42 calculates the evaluation function $P_{MU}(\theta)$ represented by equation (16) using a predetermined angular interval to find a peak, thereby estimating the arrival direction θ of the transmission wave 4 (step S46). Data representing the arrival direction θ estimated in step S46 is output to the desired wave extracting unit 43 shown in FIG. 2.

Figure 7:
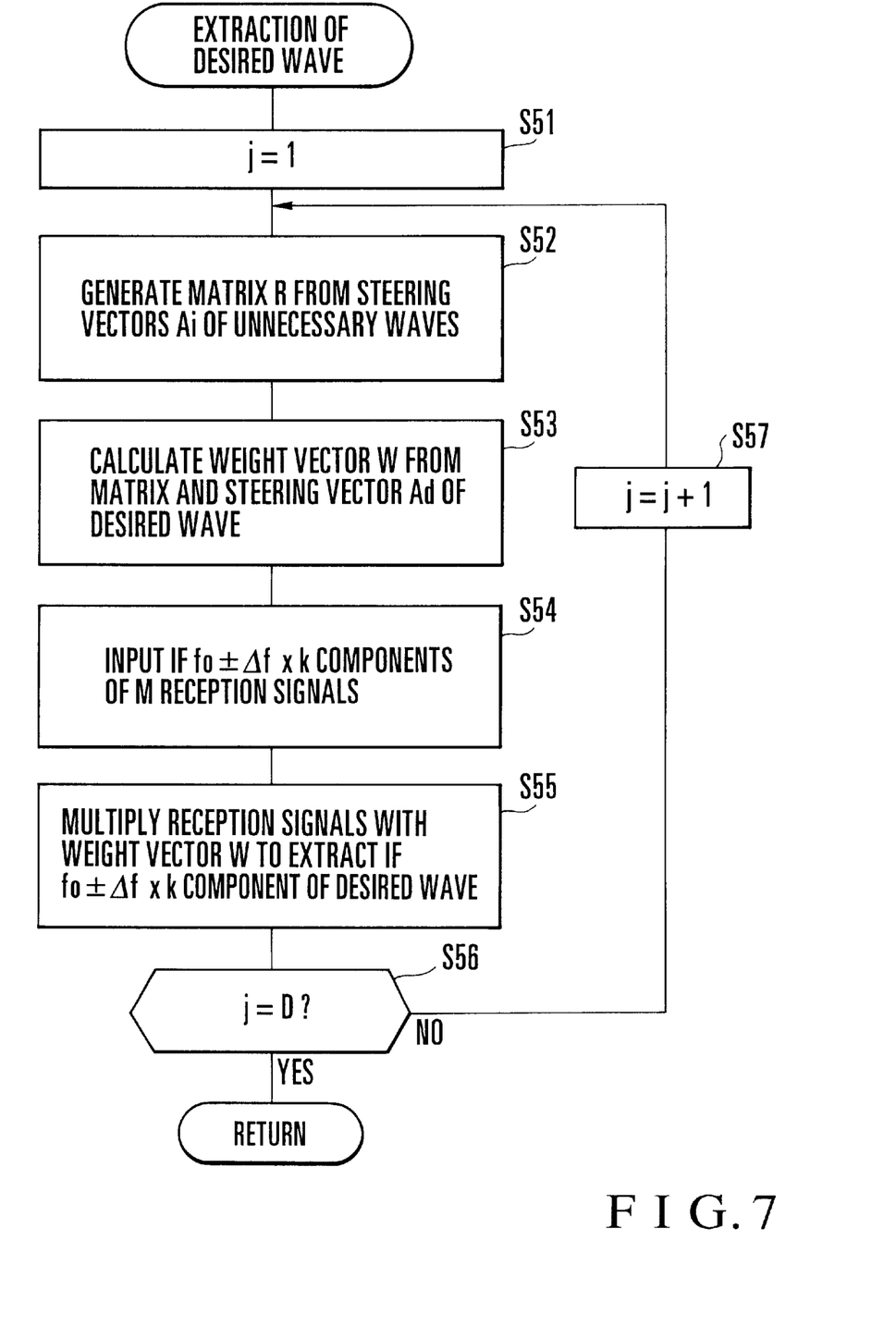
FIG. 7 is a flow chart showing the operation flow of a desired wave extracting unit shown in FIG. 2.

FIG. 7 shows the operation flow of the desired wave extracting unit 43 shown in FIG. 2. The operation of the desired wave extracting unit 43 will be described in detail with reference to FIG. 7.

Assume that the arrival direction measuring unit 42 estimates the number of arrival waves as D.

The desired wave extracting unit 43 defines the transmission wave 4 arriving from one direction $\theta_1$ as a desired wave and the transmission waves 4 arriving from the directions other than the direction $\theta_1$ as unnecessary waves (step S51). The desired wave extracting unit 43 generates the matrix R represented by equation (19) using the steering vectors $A_i$ as the responses of the linear antenna relay 10 to the directions except for the direction θ1 and the noise components a $\sigma_2$ of the receivers 21 to 2M (step S52).

The desired wave extracting unit 43 calculates the weight vector W represented by equation (20) on the basis of the steering vector $A_d$ as the response of the linear antenna relay 10 to the direction $\theta_1$ and the inverse matrix of the matrix R (step S53).

The FFT processor 41 analyzes the frequencies of the M reception signals. The desired wave extracting unit 43 receives the 2K+1 IF ($f_0 \pm \Delta f \times K$) components of the respective frequency-analyzed reception signals (step S54). The desired wave extracting unit 43 multiplies each IF component with the weight vector W to extract the IF ($f_0 \pm \Delta f \times K$) component of the desired wave (step S55).

The desired wave extracting unit 43 repeats steps S52 to S55 D times to extract the IF components of the transmission waves 4 arriving from the respective directions. The desired wave extracting unit 43 outputs them to the delay time change measuring unit 45 (steps S52 to S57).

Figure 8:
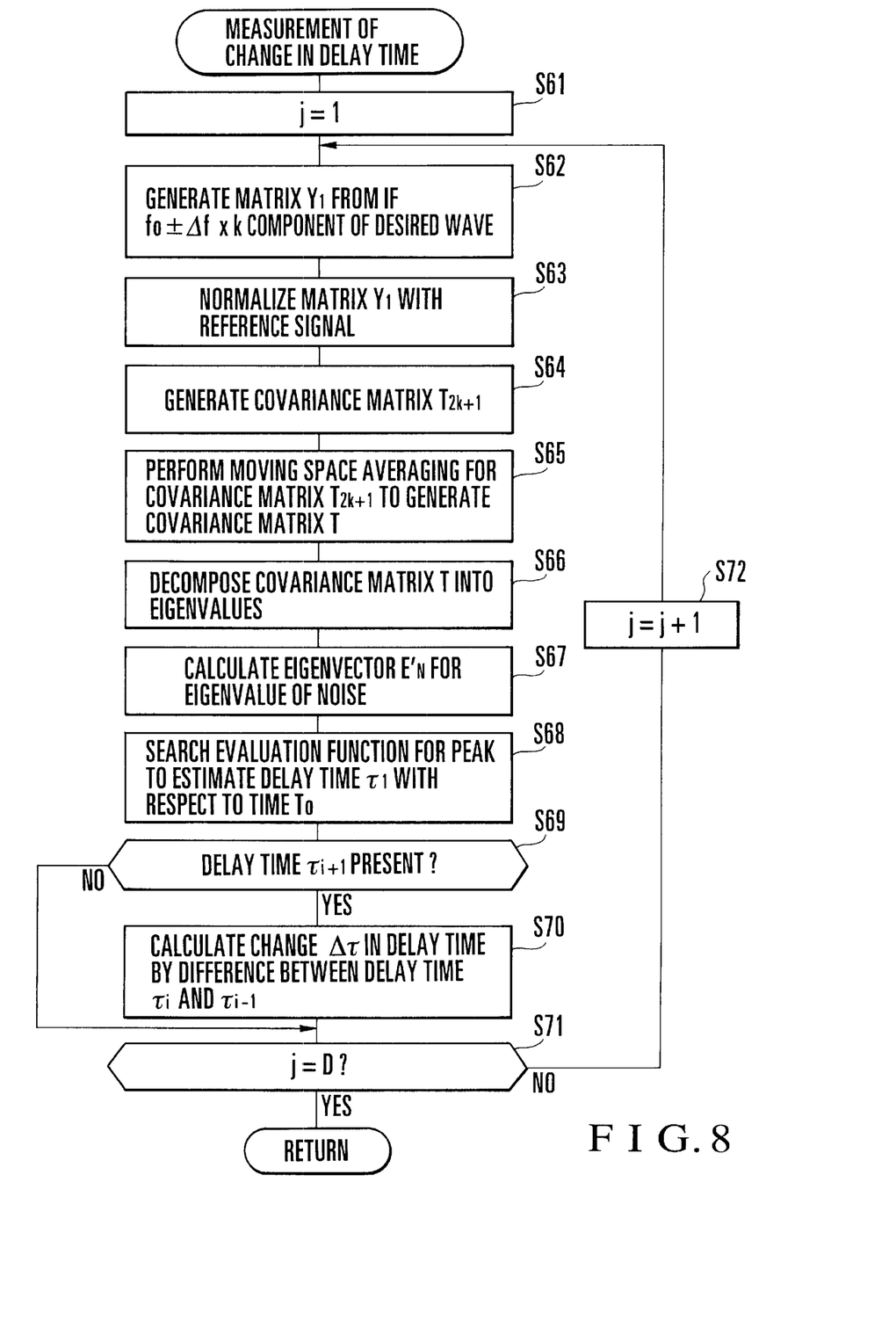
FIG. 8 is a flow chart showing the operation flow of a delay time change measuring unit shown in FIG. 2.

FIG. 8 shows the operation flow of the delay time change measuring unit 45. The operation of the delay time change measuring unit 45 will be described in detail with reference to FIG. 8.

The delay time change measuring unit 45 generates the matrix $Y_1$ represented by equation (21) using the IF $f_0 \pm \Delta f \times K$ component of the desired wave output from the desired wave extracting unit 43 (steps S61 and S62).

The delay time change measuring unit 45 divides the frequency components of the matrix $Y_1$ by the frequency components of the reference signal stored in the storage unit 44 shown in FIG. 2 to normalize the matrix $Y_1$, thereby obtaining the matrix Y represented by equation (23) (step S63).

As described above, since the reference signal is a signal having the frequency spectrum at desired time $T_0$ of the transmission wave 4, each component of the normalized matrix Y serves as a signal representing a delay state with respect to the predetermined time $T_0$.

The delay time change measuring unit 45 then generates the covariance matrix $T_{2K+1}$ is of the matrix Y, as represented by equation (27) (step S64).

The delay time change measuring unit 45 performs moving space averaging for the covariance matrix $T_{2K+1}$ to suppress the correlation between the frequencies. The resultant covariance. matrix is defined as T (step S65).

The delay time change measuring unit 45 estimates the delay time of the desired wave with respect to the predetermined time $T_0$ by the MUSIC method.

More specifically, the delay time change measuring unit 45 decomposes the covariance matrix T into eigenvalues (step 66) to calculate the eigenvector $E'_N$ for the minimum eigenvalue (step S67). The delay time change measuring unit 45 calculates the evaluation function $P_{MU}(\tau)$ represented by equation (30) at the predetermined time interval to find a peak, thereby estimating the delay time of the desired wave with respect to the predetermined time $T_0$.

The calculated delay time is the delay time of the ith reception signal input in steps S1 and S2 of FIG. 5 and defiled as $\tau_i$ (step S68).

If no delay time $\tau_{i-1}$ of the (i−1)th reception signal input in steps S1 and S2 of FIG. 5 is present, that is, if i=1, then the flow advances to step S71 (NO in step S69).

The delay time change measuring unit 45 repeats steps S62 to S69 D times to estimate the delay times $\tau_1$ of the transmission signals arriving from the respective directions with respect to the predetermined time $T_0$ (steps S62 to S69 and steps S71 and S72).

If the delay time $\tau_{i-1}$ is present in step S69, that is, if $i \geq 2$, then the flow advances to step S70 (YES in step S69). The delay time change measuring unit 45 calculates the change Δτ in delay time of the desired wave at the sampling interval nΔT of the A/D converters 31 to 3M shown in FIG. 2 on the basis of the difference between the delay times $\tau_1$ and $\tau_{i-1}$.

The delay time change measuring unit 45 repeats steps S62 to S70 D times to estimate the changes Δτ in delay times of the transmission waves 4 arriving from the respective directions and output them (steps S62 to S72).

As described above, the signal processor 40 measures the arrival directions θ of the arriving transmission waves 4 and extracts the reception signal having only the desired wave from the all the transmission waves arriving from the measured directions θ. The signal processor 40 then measures the change in delay time of each desired wave.

Assume that search for direction is performed at the interval of ΔΘ in the angular range of 0 to Θ, and that search for delay time is performed at the time interval of Δt in the time range of 0 to t. The conventional method requires calculations $(\Theta)/\Delta\Theta) \times (t/\Delta t)$ times. To the contrary, the multiple propagation wave parameter measuring method of the present invention requires search for direction only once and search for delay time only D times. Therefore, $(\Theta/\Delta\Theta) \times 1 + (t/\Delta t) \times D$ is required to greatly shorten the processing time.

The signal processor 40 normalizes only the reception signal having the desired wave output from the desired wave extracting unit 43. However, the reception signals frequency-analyzed by the FFT processor may be normalized, and the reception signal having the desired wave may be extracted from the normalized frequency-analyzed reception signals.

In this case, the storage unit 44 in FIG. 2 is connected to the input of the desired wave extracting unit 43, and the desired wave extracting unit 43 has the function of normalizing the reception signals frequency-analyzed by the FFT processor 41. This process is performed between steps S54 and S55.

The moving distance $\Delta d$ of the transmitting device 1 shown in FIG. 1 can be obtained by the change $\Delta\tau$ of the delay time of the transmission wave 4, which is measured by the receiving device 2 shown in FIG. 1. In this case, only the wave directly reaching the receiving device 2 from the transmitting device 1 is considered.

The change $\Delta\tau$ in delay time, which is measured by the receiving device 2, is the change $\Delta\tau$ in delay time at the sampling interval $n\Delta T$ of the A/D converters 31 to 3M shown in FIG. 2. Therefore, the velocity c of light is multiplied with the change $\Delta\tau$ in delay time to obtain the moving distance $\Delta d$ of the transmitting device 1 during the time $n\Delta T$.

Second Embodiment

The functions of the FFT processor 41, arrival direction measuring unit 42, desired wave extracting unit 43, and delay time change measuring unit 45 in the signal processor 40 shown in FIG. 2 can be realized by controlling a computer with a program. This program is called a multiple propagation wave parameter measuring program.

Figure 9:
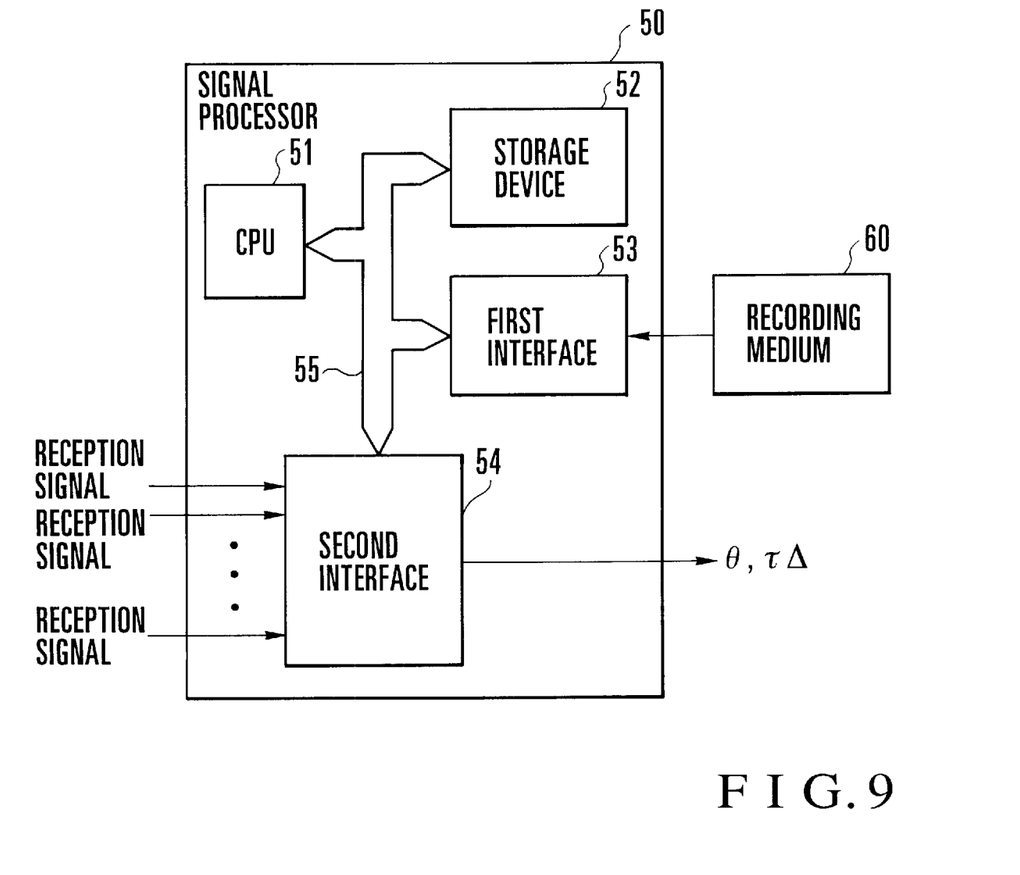
FIG. 9 is a block diagram showing the arrangement of a signal processor in a multiple propagation wave parameter measuring apparatus according to the second embodiment of the present invention.

FIG. 9 shows the arrangement of a signal processor in a multiple propagation wave parameter measuring apparatus according to the second embodiment. The remaining components, i.e., a transmitting device 1, a linear antenna array 10 constituting a receiving device 2, receivers 21 to 2M, and A/D converters 31 to 3M are identical to those in the multiple propagation wave parameter measuring apparatus shown in FIG. 1, and a detailed description thereof will be omitted.

As shown in FIG. 9, a signal processor 50 comprises a computer. This computer comprises a CPU (Central Processing Unit) 51, a storage device 52 such as a hard disk, a first interface 53, and a second interface 54. The CPU 51, the storage device 52, and the first and second interfaces 53 and 54 are connected to each other via a bus 55.

The program for controlling the CPU 51 is stored in a machine-readable recording medium 60 and provided. The recording medium 60 may be, e.g., a flexible disk, CD-ROM, or memory card.

The program recorded on the recording medium is installed in the storage device 52 via the first interface 53 of the computer. The CPU 51 operates in accordance with the program stored in the storage device 52 and realizes the same functions as those of the FFT processor 41, arrival direction measuring unit 42, desired wave extracting unit 43, and delay time change measuring unit 45 shown in FIG. 2. The CPU 51 measures arrival directions $\theta$ and changes $\Delta\tau$ in delay times of transmission waves 4 on the basis of reception signals input from the A/D converters 31 to 3M.

As has been described above, according to the present invention, the arrival directions of transmission waves are measured, and the reception signal having a desired wave arriving from one of the measured arrival directions is extracted to measure the delay time and change on the basis of the extracted signal. In detecting a change in delay time of one desired wave, changes in delay times in all the directions need not be measured. The measuring time for measuring the "arrival direction" and "change in delay time" can be shortened.

In detecting a change in delay time of each desired wave, the changes in delay times in all the directions need not be measured, thereby shortening the measuring time.

According to the present invention, the reception signals are sampled at the intervals of integer multiples of the periods of the transmission waves, and the sampled reception signals are normalized by the frequency data of the transmission waves at predetermined time. The delay times are then obtained at the predetermined time. In addition, the difference between the delay times is calculated using the two reception signals sampled at different timings, and then changes in delay times are calculated. For this reason, even if a sync signal is not sent from the transmitting side to the receiving side via a cable, the change in delay time can be measured with high precision. Therefore, the change in delay time can be measured by moving at least one of the transmitting and receiving sides.

What is claimed is:

1. A multiple propagation wave parameter measuring method comprising the steps of:

radiating transmission waves from a transmitting means;

receiving the transmission waves by a receiving means as a multiple propagation wave;

measuring arrival directions of the transmission waves on the basis of reception signals output from said receiving means;

defining the transmission wave arriving from one direction of the measured arrival directions as a desired wave and the transmission waves arriving from remaining directions as unnecessary waves, calculating a weight with which a reception power ratio of the desired wave to the unnecessary waves becomes maximum, and multiplying the reception signals with the weight to extract the reception signal in which the unnecessary waves are suppressed; and measuring a change in delay time of the desired wave from said transmitting means to said receiving means on the basis of the reception signal in which the unnecessary waves are suppressed.

2. A method according to claim 1, wherein:

said receiving means includes an antenna array obtained by aligning a plurality of antenna elements in substantially one direction; and said method further comprises the step of measuring the arrival direction by performing moving space averaging and a MUSIC method for the reception signal output from said receiving means.

3. A method according to claim 1, wherein:

the transmission wave is a periodic transmission wave; and said method further comprises the steps of:
  sampling the reception signals output from said receiving means at intervals of integer multiples of periods of the transmission waves;
  multiplying the sampled reception signals with the weight to extract the reception signal in which the unnecessary waves are suppressed;
  normalizing the reception signal, in which the unnecessary waves are suppressed, with frequency data of the transmission waves at a predetermined time;

performing moving space averaging and the MUSIC method for the normalized reception signal to estimate a delay time of the reception signal, in which the unnecessary waves are suppressed, with respect to the predetermined time; and measuring the change on the basis of a difference between the delay times estimated from two reception signals sampled at different timings.

4. A method according to claim 1, wherein:

the transmission wave is a periodic transmission wave; and said method further comprises the steps of:

sampling the reception signals output from said receiving means at intervals of integer multiples of periods of the transmission waves;

normalizing the sampled reception signals with frequency data of the transmission waves at a predetermined time;

multiplying the normalized reception signals with the weight to extract the reception signal in which the unnecessary waves are suppressed;

performing moving space averaging and the MUSIC method for the reception signal to estimate a delay time of the reception signal, in which the unnecessary waves are suppressed, with respect to the predetermined time; and measuring the change on the basis of a difference between the delay times estimated from two reception signals sampled at different timings.

5. A method according to claim 1, further comprising the step of calculating the weights for the respective desired waves arriving from the measured arrival directions, extracting the reception signals in which the respective unnecessary waves are suppressed, and measuring the changes of the respective desired waves.

6. A multiple propagation wave parameter measuring apparatus comprising:

transmitting means for transmitting transmission waves;

receiving means for receiving the transmission waves as a multiple propagation wave and outputting reception signals;

arrival direction measuring means, connected to an output of said reception means, for measuring arrival directions of the transmission waves on the basis of the reception signals;

desired wave extracting means, connected to an output of said arrival direction measuring means and the output of said receiving means, for defining the transmission wave arriving from one direction of the arrival directions measured by said arrival direction measuring means, as a desired wave and the transmission waves arriving from remaining directions as unnecessary waves, calculating a weight with which a reception power ratio of the desired wave to the unnecessary waves becomes maximum, and multiplying the reception signals with the weight to extract the reception signal in which the unnecessary waves are suppressed; and delay time change measuring means, connected to an output of said desired wave extracting means, for measuring a change in delay time of the desired wave from said transmitting means to said receiving means on the basis of the reception signal in which the unnecessary waves are suppressed.

7. An apparatus according to claim 6, wherein:

said receiving means includes an antenna array obtained by aligning a plurality of antenna elements in substantially one direction; and said arrival direction measuring means includes means for measuring the arrival direction by performing moving space averaging and a MUSIC method for the reception signal output from said receiving means.

8. An apparatus according to claim 6, wherein:

the transmission wave is a periodic transmission wave, said apparatus further comprises:

sampling means, connected to the output of said receiving means and an output of said desired wave extracting means, for sampling the reception signals output from said receiving means at intervals of integer multiples of periods of the transmission waves and outputting the sampled reception signals to said desired wave extracting means;

storage means connected to an output of said delay time change measuring means and pre-storing frequency data of the transmission waves at predetermined time; and said delay time change measuring means includes:

means for normalizing the reception signal, in which the unnecessary waves are suppressed, with the frequency data, performing moving space averaging and a MUSIC method for the normalized reception signal, and estimating a delay time with respect to the predetermined time; and means for measuring the change on the basis of delay times estimated from two reception signal sampled by said sampling means at different timings.

9. An apparatus according to claim 6, wherein:

said desired wave extracting means includes means for obtaining the weights for the respective desired waves arriving from the respective arrival directions measured by said arrival direction measuring means and extracting the reception signals in which the respective unnecessary waves are suppressed; and said delay time change measuring means includes means for measuring the changes of respective desired waves.

10. A machine-readable recording medium recording a multiple propagation wave parameter measuring program for a computer connected to an output of a receiving means for receiving transmission waves radiated from a transmitting means as a multiple propagation wave and outputting reception signals, the program causing the computer to function as:

arrival direction measuring means for measuring arrival directions of the transmission waves on the basis of the reception signals;

desired wave extracting means for defining the transmission wave arriving from one direction of the arrival directions measured by said arrival direction measuring means, as a desired wave and the transmission waves arriving from remaining directions as unnecessary waves, calculating a weight with which a reception power ratio of the desired wave to the unnecessary waves becomes maximum, and multiplying the reception signals with the weight to extract the reception signal in which the unnecessary waves are suppressed; and delay time change measuring means for measuring a change in delay time of the desired wave from said transmitting means to said receiving means on the basis of the reception signal in which the unnecessary waves are suppressed.

11. A medium according to claim 10, wherein the multiple propagation wave parameter measuring program causes said arrival direction measuring means to include means for measuring the arrival direction by performing moving space averaging and a MUSIC method for the reception signal output from said receiving means.

12. A medium according to claim 10, wherein:

sampling means is connected to the output of said receiving means and an input of said computer to sample the reception signals output from said receiving means at intervals of integer multiples of periods of the transmission waves and output the sampled reception signals to said computer;

the multiple propagation wave parameter measuring program causes said delay time change measuring means to include means for normalizing the reception signal, in which the unnecessary waves are suppressed, with the frequency data, performing moving space averaging and a MUSIC method for the normalized reception signal, and estimating a delay time with respect to the predetermined time; and means for measuring the change on the basis of delay times estimated from two reception signal sampled by said sampling means at different timings.

13. A medium according to claim 10, wherein:

the multiple propagation wave parameter measuring programs causes said desired wave extracting means to include means for obtaining the weights for the respective desired waves arriving from the respective arrival directions measured by said arrival direction measuring means and extracting the reception signals in which the respective unnecessary waves are suppressed; and said delay time change measuring means to include means for measuring the changes of the respective desired waves.

14. A method for measuring a parameter of a multiple propagation wave produced by a transmitter which radiates transmission waves, said method comprising the steps of:

receiving said transmission waves by receiver as a multiple propagation wave;

measuring arrival directions of said transmission waves on the basis of reception signals output from said receiver;

defining the transmission wave arriving from a particular direction of the measured arrival directions as a desired wave and the transmission waves arriving from other directions as unnecessary waves;

calculating a weight vector, said weight vector, when applied to said transmission waves, yields a maximum reception power ratio of the desired wave to said unnecessary waves;

multiplying the reception signals with the weight vector to extract a particular reception signal in which the unnecessary waves are suppressed; and measuring a change in delay time of said desired wave from said transmitter to said receiver on the basis of said particular reception signal.

15. The method as recited in claim 14, wherein:

said receiver includes an antenna array obtained by aligning a plurality of antenna elements in substantially one direction; and said method further comprises the step of measuring the arrival direction by performing moving space averaging and a MUSIC method for the reception signal output from said receiver.

16. The method as recited in claim 14, wherein:

said transmission waves are periodic; and said method further comprises the steps of:

sampling said reception signals output from said receiver at intervals of integer multiples of periods of said transmission waves;

multiplying the sampled reception signals with the weight vector to extract said particular reception signal;

normalizing said particular reception signal with frequency data of said transmission waves at a defined time;

performing moving space averaging and the MUSIC method for the normalized reception signal to estimate a delay time of said particular reception signal with respect to said defined time; and measuring said change on the basis of a difference between the delay times estimated from two reception signals sampled at different timings.

17. A method according to claim 14, wherein:

said transmission waves are periodic; and said method further comprises the steps of:

sampling the reception signals output from said receiver at intervals of integer multiples of periods of said transmission waves;

normalizing the sampled reception signals with frequency data of said transmission waves at a defined time;

multiplying the normalized reception signals with the weight vector to extract said particular reception signal;

performing moving space averaging and the MUSIC method for the reception signal to estimate a delay time of said particular reception signal with respect to said defined time; and measuring said change on the basis of a difference between the delay times estimated from two reception signals sampled at different timings.

18. A method according to claim 14, further comprising the steps of:

calculating the weights for the respective desired waves arriving from the measured arrival directions;

extracting the particular reception signals in which the respective unnecessary waves are suppressed; and measuring the changes of the respective desired waves.

19. An apparatus for measuring a parameter of a multiple propagation wave produced by a transmitter which radiates transmission waves, said apparatus comprising:

a receiver which receives said transmission waves as a multiple propagation wave and outputs reception signals;

an arrival direction detector, connected to an output of said receiver, said arrival direction detector measures arrival directions of said transmission waves on the basis of said reception signals;

a desired wave detector connected to an output of said arrival direction detector and the output of said receiver, said desired wave detector defines the transmission wave arriving from one direction of the arrival directions measured by said arrival direction detector as a desired wave, and the transmission waves arriving from other directions as unnecessary waves, said desired wave detector calculates a weight vector, said weight vector, when applied to said transmission waves, yields a maximum reception power ratio of the desired wave to the unnecessary waves, said desired wave detector multiplies the reception signals with the weight vector to extract the reception signal in which the unnecessary waves are suppressed; and a delay time change measuring unit, connected to an output of said desired wave detector, said delay time changing measuring unit measures a change in delay time of the desired wave from said transmitter to said receiver on the basis of the reception signal in which the unnecessary waves are suppressed.

20. An apparatus according to claim 19, wherein:

said receiver includes an antenna array obtained by aligning a plurality of antenna elements in substantially one direction; and said arrival direction detector measures the arrival direction by performing moving space averaging and a MUSIC method for the reception signal output from said receiver.

21. An apparatus according to claim 19, wherein:

said transmission waves are periodic; and said apparatus further comprises:
   a sampling circuit, connected to the output of said receiver and an output of said desired wave detector, said sampling circuit samples said reception signals output from said receiver at intervals of integer multiples of periods of said transmission waves and outputs the sampled reception signals to said desired wave detector;
   a memory connected to an output of said delay time change measuring unit, said memory stores frequency data of the transmission waves at a defined time; and
   said delay time change measuring unit includes:
      a normalization circuit which normalizes said particular reception signal with said frequency data, performs moving space averaging and a MUSIC method for the normalized reception signal, and estimates a delay time with respect to said defined time; and
      a measuring circuit which measures said change on the basis of delay times estimated from two reception signal sampled by said sampling circuit at different timings.

22. The apparatus as recited in claim 19, wherein:

said desired wave detector obtains the weights for the respective desired waves arriving from the respective arrival directions measured by said arrival direction detector and extracts particular reception signals in which the respective unnecessary waves are suppressed; and said delay time change measuring unit measures the changes of respective desired waves.

23. A machine-readable recording medium including data for measuring a parameter of a multiple propagation wave transmitted by a transmitter, said data including information for performing the steps of:

receiving said transmission waves by receiver as a multiple propagation wave;

measuring arrival directions of said transmission waves on the basis of reception signals output from said receiver;

defining the transmission wave arriving from a particular direction of the measured arrival directions as a desired wave and the transmission waves arriving from other directions as unnecessary waves;

calculating a weight vector, said weight vector, when applied to said transmission waves, yields a maximum reception power ratio of the desired wave to said unnecessary waves;

multiplying the reception signals with the weight vectors to extract a particular reception signal in which the unnecessary waves are suppressed; and measuring a change in delay time of said desired wave from said transmitter to said receiver on the basis of said particular reception signal.

24. The medium as recited in claim 23, wherein:

said receiver includes an antenna array obtained by aligning a plurality of antenna elements in substantially one direction; and said data further comprises information for performing the step of measuring the arrival direction by performing moving space averaging and a MUSIC method for the reception signal output from said receiver.

25. The medium as recited in claim 23, wherein:

said transmission waves are periodic; and said data further includes information for performing the steps of:
   sampling said reception signals output from said receiver at intervals of integer multiples of periods of said transmission waves;
   multiplying the sampled reception signals with the weight vectors to extract said particular reception signal;
   normalizing said particular reception signal with frequency data of said transmission waves at a defined time;
   performing moving space averaging and the MUSIC method for the normalized reception signal to estimate a delay time of the particular reception signal with respect to the defined time; and
   measuring the change on the basis of a difference between the delay times estimated from two reception signals sampled at different timings.

26. A medium as recited in claim 23, wherein:

said transmission waves are periodic; and said data further includes information for performing the steps of:
   sampling the reception signals output from said receiver at intervals of integer multiples of periods of said transmission waves;
   normalizing the sampled reception signals with frequency data of said transmission waves at a defined time;
   multiplying the normalized reception signals with the weight vector to extract said particular reception signal;
   performing moving space averaging and the MUSIC method for the reception signal to estimate a delay time of said particular reception signal with respect to said defined time; and
   measuring said change on the basis of a difference between the delay times estimated from two reception signals sampled at different timings.

27. A medium as recited in claim 23, wherein said data further includes information for performing the steps of:

calculating the weights for the respective desired waves arriving from the measured arrival directions;

extracting the particular reception signals in which the respective unnecessary waves are suppressed; and measuring the changes of the respective desired waves.

* * * * *